United States Patent [19]
Tylmann et al.

[11] Patent Number: 5,422,020
[45] Date of Patent: Jun. 6, 1995

[54] SOLID-BED REACTOR FOR BIOLOGICAL SEWAGE TREATMENT

[75] Inventors: Josef Tylmann; Peter Pamperl, both of Winterthur, Switzerland

[73] Assignee: Sulzer Brothers Limited, Winterhur, Switzerland

[21] Appl. No.: 121,084

[22] Filed: Sep. 14, 1993

Related U.S. Application Data

[63] Continuation of Ser. No. 885,692, May 19, 1992, abandoned.

[30] Foreign Application Priority Data

Jun. 7, 1991 [CH] Switzerland ............ 01699/91

[51] Int. Cl.$^6$ .............................................. C02F 3/02
[52] U.S. Cl. ...................... 210/807; 210/150; 210/220; 210/274; 210/293; 210/617; 210/620
[58] Field of Search ................. 210/274, 293, 95, 275, 210/220, 150, 151, 291, 807, 617, 620; 261/77, 121.1, 126, DIG. 70

[56] References Cited

U.S. PATENT DOCUMENTS

| | | | |
|---|---|---|---|
| 1,871,122 | 8/1932 | Kretzschmar | 210/274 |
| 3,512,649 | 5/1970 | Nebolsine et al. | 210/293 |
| 3,954,620 | 5/1976 | Nebolsine | 210/293 |
| 4,118,322 | 10/1978 | San Roman | 210/293 |
| 4,191,652 | 3/1980 | Whitmore | 210/274 |
| 4,435,286 | 3/1984 | Louboutin et al. | 210/274 |
| 4,504,388 | 3/1985 | Desbos et al. | 261/77 |
| 4,579,659 | 4/1986 | Eades et al. | 210/293 |
| 4,604,197 | 8/1986 | Louboutin et al. | 210/293 |
| 4,818,404 | 4/1989 | McDowell | 210/603 |
| 5,028,322 | 7/1991 | Soriente | 210/293 |
| 5,087,354 | 2/1992 | Montagnon et al. | 210/274 |
| 5,156,738 | 10/1992 | Maxson | 210/274 |
| 5,160,613 | 11/1992 | Walter | 210/274 |

FOREIGN PATENT DOCUMENTS

| | | |
|---|---|---|
| 0250316 | 12/1987 | European Pat. Off. |
| 1216247 | 5/1966 | Germany . |
| 3321436 | 12/1983 | Germany . |
| 8050 | 9/1922 | Netherlands . |
| 366822 | 3/1963 | Switzerland . |
| 924799 | 5/1963 | United Kingdom . |

Primary Examiner—Cynthia L. Nessler
Attorney, Agent, or Firm—Townsend and Townsend Khourie and Crew

[57] ABSTRACT

A solid-bed reactor for biological sewage treatment has an intermediate floor which carries floor jets and by means of which the solid bed can be backwashed. The intake for the sewage is above the solid bed. Aeration orifices are integrated into the floor jets, and gas bubbles can be introduced by the orifices in the upper portions of the floor jets without thereby giving rise to instability phenomena. To ensure stable uniform distribution of aeration throughout the reactor, the clear cross-section in the entire intake region of each floor jet must be such that above the aeration orifices the flow of outgoing water does not impede the ascent of the gas bubbles.

10 Claims, 3 Drawing Sheets

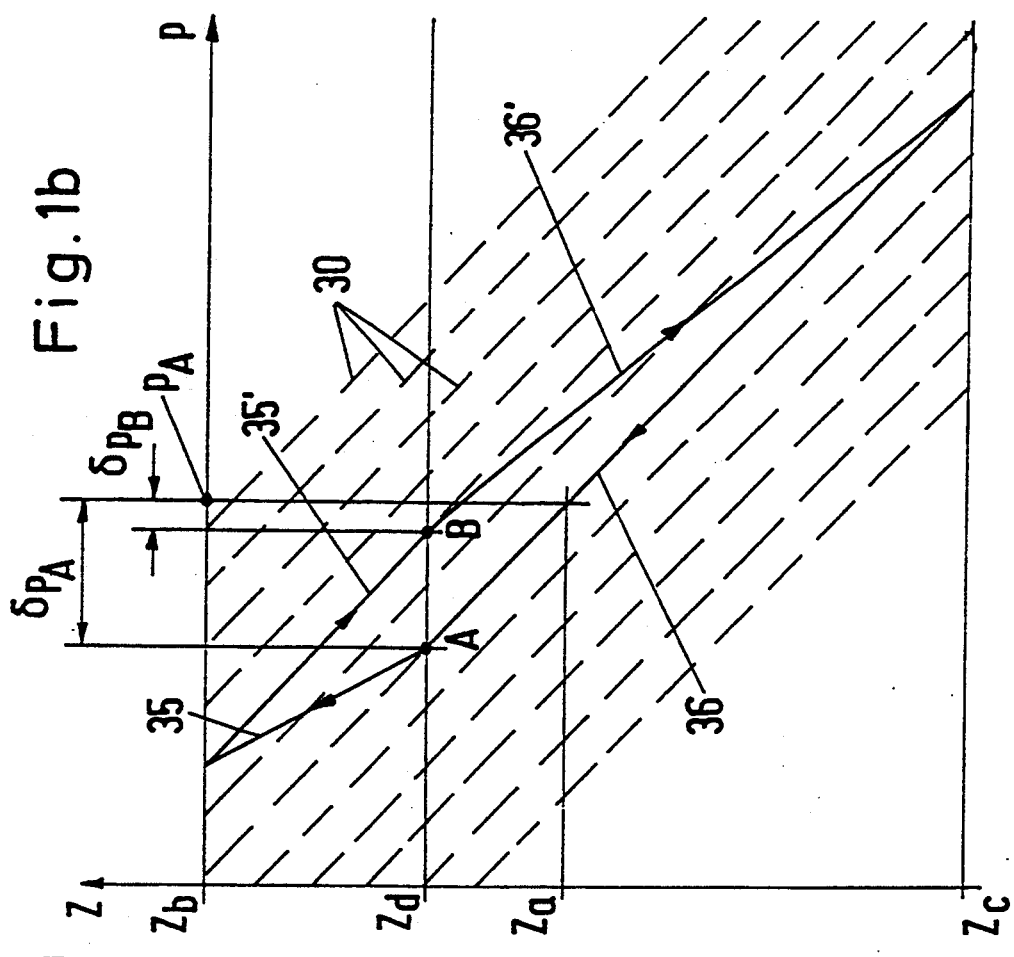
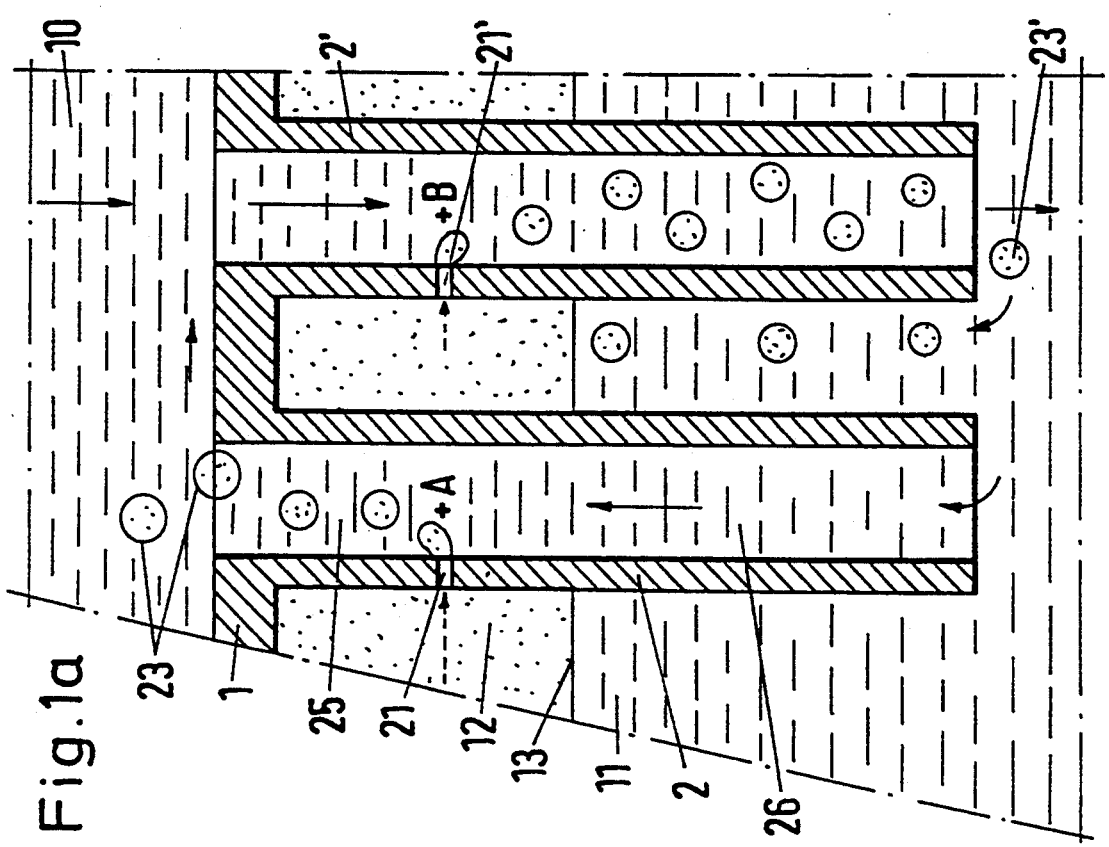

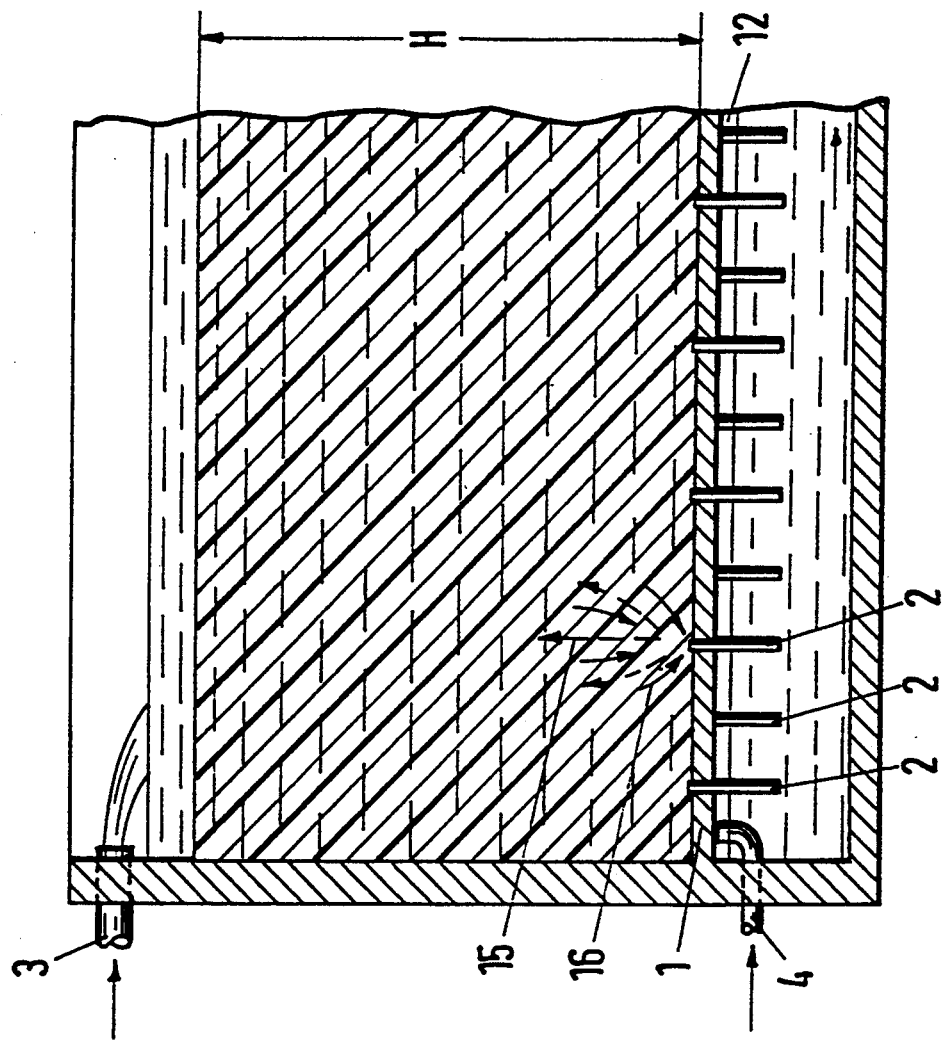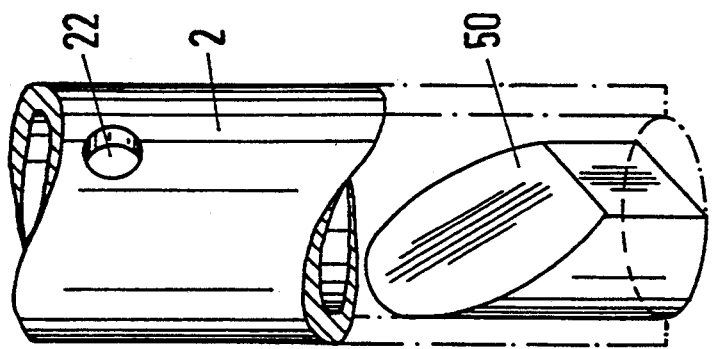

SOLID-BED REACTOR FOR BIOLOGICAL SEWAGE TREATMENT

This is a continuation of U.S. application Ser. No. 07/885,692, filed May 19, 1992, now abandoned.

BACKGROUND OF THE INVENTION

The invention relates to a solid-bed reactor for biological sewage treatment with a sewage intake above the solid bed, an intermediate floor with floor jets for back washing the solid bed, and aeration orifices.

Apparatus for the filtration and biological treatment of sewage is known which has a flooded, aerated solid bed and in which the raw water flows in countercurrent to the air introduced (see for example M. Payraudeau, J.-Y. Bontonou "Traitement biologique à basse température selon un procédé de filtration biologique aérée: le BIOCARBONE", ("Low temperature biological treatment by a method of aerated biological filtration: BIOCARBONE") Les Eaux Usées Diluées, 1990, p. 395). The aeration orifices in the "Biocarbone" method are approximately 30 cm above the intermediate floor, within the solid bed. The oxygen introduced and the biodegradable constituents of the raw water lead to the propagation of micro-organisms which colonise the surfaces of the packing elements. Periodically some of the growing biomass must be removed. This is done with an air/water mixture which is driven through the solid bed by means of the floor jets in the intermediate floor. Along with the biomass this removes particles which have settled out of the raw water in the solid bed.

German Offenlegungsschrift 33 21 436 discloses apparatus of the type described above in which the intermediate floor contains apertures for aeration; aeration orifices of a special design provide an oxygen supply which is largely unaffected by variations in the degree of clogging of the solid bed. The air may be supplied by way of an air cushion below the intermediate floor, the cushion being only a few centimeters deep. French Patent Specification 2 596 385 proposes a floor jet of substantially conventional construction with an integral aeration orifice in the form of a small hole. With this simple and apparently very convenient floor jet (orifice), however, as experience shows, a stability problem occurs, making such floor jets impossible to use. This problem will be explained below with reference to the drawings.

SUMMARY OF THE INVENTION

An object of the invention is to create a solid-bed reactor of which the floor jets comprise at least in part integrated aeration orifices, it being possible to operate the system with a uniform supply of air, that is, without the stability problem mentioned above. This object is achieved by means of floor jets which are integrated into the floor jets. The jets are constructed so that the flow rate of water leaving the floor jet is less than the rate of ascent of the gas bubbles.

The solid bed of the reactor of the invention may comprise a loose or regular packing, for example of Raschig rings or elements for static mixers. The surfaces of the packing elements may be covered with micro-organisms; alternatively, however, they may be coated with catalysts which bring about the biochemical processes. By means of the aeration orifices compressed ambient air or, for example, oxygen-enriched air can be fed to the solid bed.

BRIEF DESCRIPTION OF THE DRAWINGS

FIG. 1a shows diagrammatically two adjoining floor jets with integral aeration orifices, with which the uniform introduction of gas into the solid bed is not possible;

FIG. 1b is a diagram representing the static pressure p in the two floor jets in FIG. 1a;

FIG. 5 shows a flow restrictor for the floor jet; and

FIG. 6 represents a vertical section through part of a solid-bed reactor embodying the invention.

DESCRIPTION OF THE PREFERRED EMBODIMENTS

Figure 4:
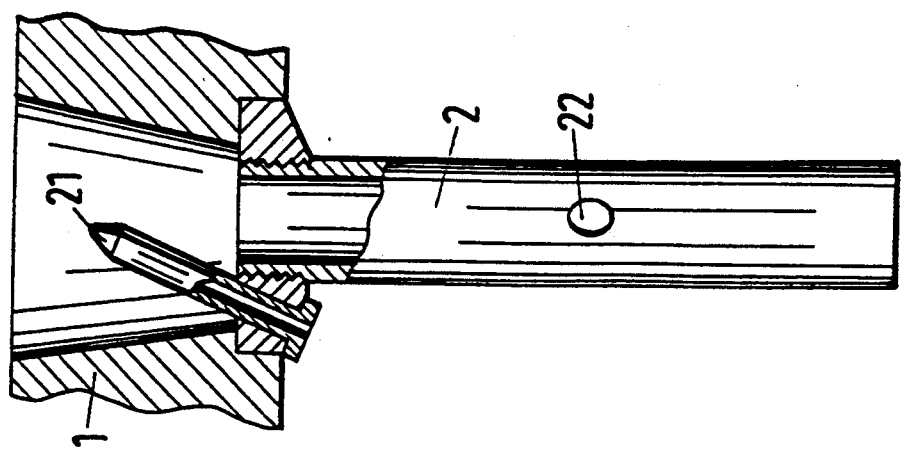
FIG. 4 illustrates a third embodiment of floor jet, in which the aeration orifice is a separate component.

FIGS. 1a and 1b illustrate an imaginary "experiment" intended to explain the above-mentioned stability problem in aeration via the floor jet. FIG. 1a shows part of the intermediate floor 1 with two tubular floor jets 2, 2'. The space 10 above the intermediate floor contains the flooded solid bed (not shown). Below the intermediate floor 1 lie the liquid-filled space 11 and air cushion 12.

For the discussion of the pressure conditions, a z-axis is introduced along the length of the floor jet 2. The jet 2 extends between $z=z_b$ and $z=z_c$ see FIG. 1b). The liquid level 13 below the air cushion 12 is at the level $z=z_a$. At a level $z=z_d$ the jet 2 contains a bore 21, provided as an aeration orifice. (Bores for washing air are irrelevant to the discussion below and are therefore disregarded. ) The diagram in FIG. 1b represents the static pressure p as a function of the z-co-ordinate. The group 30 of curves shown with broken lines represents the variation in p in the undisturbed liquid. The introduction of gas bubbles in the floor jets 2, 2' reduces the effective density of the liquid, so that the pressure curve changes. A point A in the diagram represents the pressure occurring in the liquid-filled jet 2 at the level of the aeration orifice 21 (also designated A). The same applies for a point B and the second floor jet 2'. The curve portion 35 represents the pressure in the upper portion 25 of the jet 2 (the portion in which gas bubbles are rising). The pressure in the lower portion 26 is represented by a curve portion 36. The pressure in the air cushion 12 is $P_A$. The pressure difference $\delta p_A$ (see FIG. 1b) is the driving force carrying the gas through the aeration orifice 21.

After passing through the solid bed the liquid is to flow down through the floor jets in countercurrent with the gas bubbles 23 introduced. If the countercurrent is weak the gas flow (dotted arrows in FIG. 1a) can be uniform over all the floor jets 2. If the countercurrent progressively increases, an unstable situation occurs in which the flow pattern is reversed. In some of the floor jets 2 the countercurrent fails; on the contrary, liquid is carried upwards by the gas bubbles 23. In the other floor jets—viz. in adjoining floor jets 2'—the rate of flow of the liquid flowing down is substantially increased, to the extent that the gas bubbles 23' still being introduced through the bore 21' are carried downwards. (The solid arrows indicate the liquid flow.) Because of the reduced effective density, the pressure follows the curved portion 36' in the lower portion of the jets 2' and the curved portion 35' in the upper portion, which is free of gas bubbles. The driving force carrying the gas through the aeration orifice 21' has reduced to the pressure difference $\delta p_b$ (see FIG. 1b), so that a restricted flow of gas occurs there.

In this discussion of the stability problem simplifying assumptions have been made (more particularly the disregarding of pressure losses due to the flowing liquid, and also of the washing air apertures in the floor jets. More precise analysis of this problem, however, would not in any way affect the qualitative content (as the empirical data suggest).

Now that the stability problem is understood, it is clear that uniform aeration of the solid bed cannot occur unless the gas bubbles introduced are not carried downwards by the liquid flowing in countercurrent. In other words, the outgoing water flow must not impede the rise of the gas bubbles. The condition for fulfilling this demand may be expressed as follows: in the entire intake region of each floor jet the clear cross-section above the aeration orifices 21 must be such that the speed of the liquid moving in countercurrent is less than the speed of ascent of the gas bubbles 23.

The above-mentioned "clear cross-section" must also on occasion allow for additional fittings, for example jet or orifice heads, or the construction of the solid bed. The rate of ascent of the gas bubbles 23, which depends on the bubble diameter, can be estimated by calculation (for example using Stokes' resistance formula, found in textbooks), or alternatively of course it may be determined experimentally. In selecting the dimensions of the floor jet it is necessary to bear in mind that the gas bubbles also take up part of the area of the cross-section. It should also be noted that where there is a strong countercurrent the density of the gas bubbles in the critical area is also greater, and so the cross-section affected by the bubbles is also greater. It may be convenient, for a rough calculation of the dimensions of the jets, to apply the following rule-of-thumb: the cross-section of the floor jets should be such that in the absence of an influx of air the speed of the water flowing down is substantially less—that is, a factor of approximately 10 less—than the average speed of ascent of the gas bubbles. Detailed calculations or experiments may however give results substantially different from those obtained by the rule-of-thumb.

Figure 2:
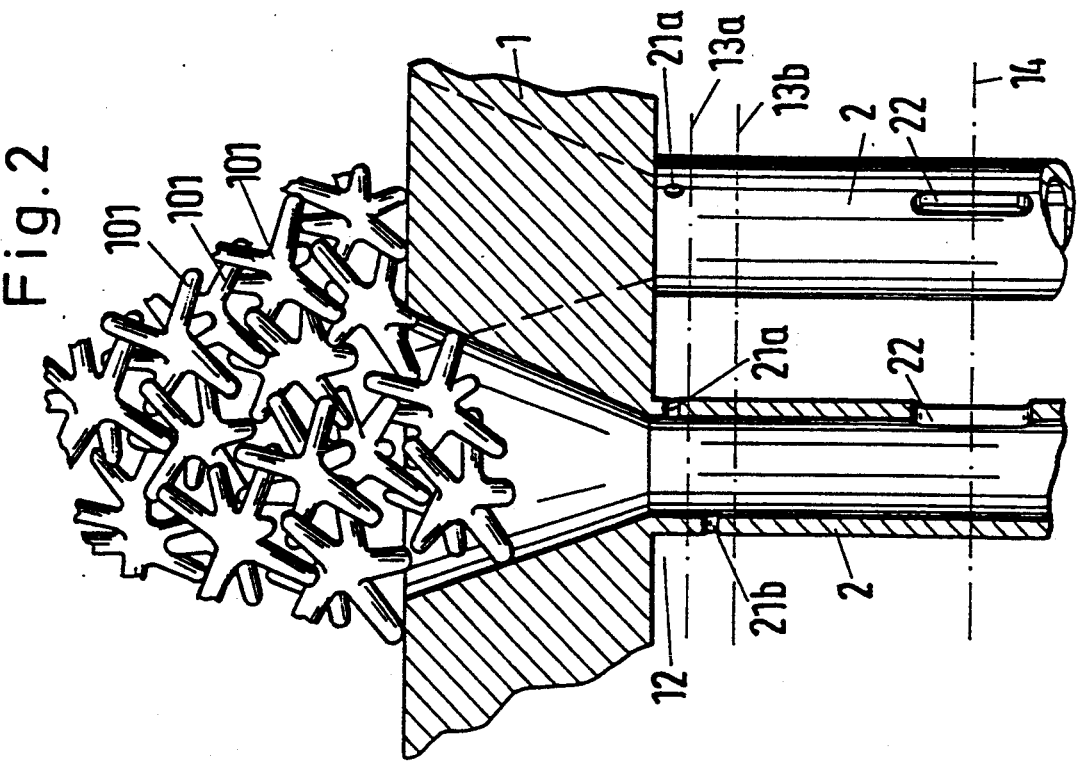
FIG. 2 illustrates floor jets with integrated aeration orifices in a solid bed reactor embodying the invention.

FIG. 2 illustrates a first embodiment of the floor jet 2 in a solid-bed reactor embodying the invention. The solid bed, which rests on the intermediate floor 1, and of which a detail is shown, comprises a packing of packing elements 101. The floor jet 2 has two aeration orifices 21a, 21b, situated at different heights. If the water level below the air cushion 12 is on the chain line 13a, aeration occurs only through the upper orifice 21a. If the pressure in the air cushion 12 is increased, the water level falls, and at the same time there is an increase in the air intake through the upper aeration orifice 21a. If the water level falls further to below the second aeration orifice 21b (line 13b), air also flows through this orifice 21b into the solid bed. A slot-like aperture 22 supplies washing air to back-wash the solid bed. The water level is then, for example, level with a chain line 14.

If the solid bed comprises a loose packing, the packing elements 101 may enter the mouth of the jet 5 as indicated in FIG. 2. This may so restrict the clear cross-section in the intake region as to prevent any contrary flow of water and gas bubbles there. This problem can be solved, for example, by means of gratings placed over the jets 5 to hold the packing elements 101 away from the jet mouth.

The solid bed generally acts like a static mixer ensuring distribution of the gas bubbles in the reactor. Such distribution is especially good if the solid bed comprises a packing of static mixing elements, at least in the floor area.

Figure 3:
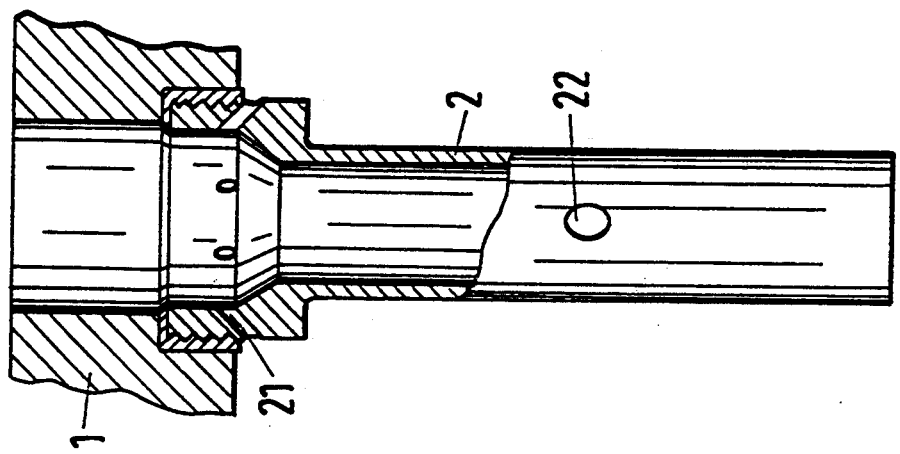
FIG. 3 illustrates a second embodiment of floor jet.

The floor jet 5 shown in FIG. 3 has a ring of aeration orifices 21 at a single level. The diameter of the jet 5 is larger above than below, to the extent that water and gas bubbles can flow in countercurrent above the aeration orifices 21. The jet 5 is attached releasably to the underside of the intermediate floor. The jets 5 can therefore be exchanged much more satisfactorily if required than is possible in conventional jet floors, since it is not necessary to remove the solid bed before replacing jets.

FIG. 4 illustrates a floor jet 5 with a separate integrated aeration orifice 21. This orifice 21 is replaceable and is readily accessible from below for cleaning purposes. Also possible, for example, are separate aeration orifices respectively comprising a tube with lateral orifice apertures.

In the embodiments shown in the drawings the aeration orifices 21 are supplied from the air cushion 12 below the intermediate floor (see FIG. 2). Alternatively, however, the aeration orifices could be connected to a system of supply lines. This is advantageous if aeration is performed with oxygen or with oxygen-enriched air.

Depending on the oxygen requirement it may be advantageous, in addition to the floor jets with integrated aeration orifices, to provide separate aeration orifices in the intermediate floor. Conversely, however, it may be advantageous for cost reasons if not all floor jets have integrated aeration orifices.

Current floor jets customarily have nozzle heads with slit-like apertures. These nozzle heads, besides serving to hold back granular solid-bed material, act as flow restrictors, ensuring by restricting the water flowing down that the flow is uniform over the entire reactor. For the solid-bed reactor of the invention such nozzle heads are unsuitable, since they would impede the ascent of the gas bubbles. The necessary flow restriction must be by means provided in the floor jet below the integrated aeration orifice. An embodiment of such a flow restrictor is illustrated in FIG. 5, in which the flow restrictor 50 reduces the cross-section at the bottom end of the floor jet 2.

In conclusion, a brief example for a solid-bed reactor embodying the invention (FIG. 6): the reactor, with an area of 40 m$^2$, has a solid bed of a height H=7 m and a specific surface area of 250 m$^2$/m$^3$. The average sewage flow (inlet pipe 3) is approximately 10,000 m$^3$/d, and the rate of downward water flow therefore averages approximately 10 m/h. The aeration rate (supply pipe 4), which is controlled, is at most approximately 20,000 Nm$^3$/d. (In FIG. 6, for one floor jet 2, the air introduced is indicated by broken arrows 15 and the water flowing in countercurrent by solid arrows 16. ) The intermediate floor 1 is made from prefabricated concrete jet plates, with sixty-four tubular jets per square meter. Washing of the solid bed is performed with an air/water mixture, the wash water velocity in the solid bed being 55 m/h and the washing air velocity 60 m/h.

During aeration of the solid bed, performed in accordance with the invention by way of the air cushion 12 which is only a few centimeters deep, gas bubbles are introduced into the floor jets 2 at an average ascent velocity of approximately 20 cm/s. The diameter of the floor jets 2 should—in accordance with the rule-of-thumb given above and with the above-mentioned proviso—be so selected that with no intake of air the rate of flow of the water down through the jet (approximately 0.044 1/s) is substantially less than 20 cm/s—that is, less than approximately 2 cm/s. It follows from this that the floor jets should have a diameter of about 5 to 5.5 cm.

We claim:

1. A method for treating a liquid in a solid bed reactor of the type having a floor, an intermediate floor positioned above the floor defining a first container portion above the intermediate floor and a second container portion below the intermediate floor, a liquid inlet having means for discharging liquid into the first container portion and a liquid outlet having means for discharging liquid from the second container portion, a plurality of floor jets supported by the intermediate floor and fluidly coupling the first and second container portions, the plurality of floor jets including an aeration orifice and having a cross section at the level of the aeration orifice, the method comprising the following steps:

flowing liquid into the treatment container through the liquid inlet at a flow rate and out the treatment container through the liquid outlet at the flow rate;

producing gas bubbles in the floor jets at the aeration orifice, the gas bubbles having an upward ascension rate relative to the liquid; and selecting the flow rate so that a downwardly directed liquid flow speed in the plurality of floor jets at the cross-section is greater than zero and does not exceed the ascension rate thereby producing a countercurrent in the floor jets so that the gas bubbles ascend upwardly through the floor jets into the first container portion while the liquid flows downwardly in the floor jets from the first container portion to the second container portion.

2. A solid bed reactor for treating a liquid comprising:

a floor and a sidewall;

an intermediate floor positioned above the floor and defining a first container portion above the intermediate floor and a second container portion below the intermediate floor, the first container portion containing a solid bed;

a liquid inlet having means for discharging liquid into the first container portion;

a liquid outlet having means for discharging liquid from the second container portion;

a plurality of floor jets supported by the intermediate floor and fluidly coupling the first and second container portions, the plurality of floor jets extending downwardly from the intermediate floor and including an aeration orifice the aeration orifice being positioned in the second container portion, the first and second container portions being fluidly coupled by substantially only the plurality of floor jets;

means for producing gas bubbles at the aeration orifice, the gas bubbles having an upward ascension rate, the gas bubbles rising through the liquid and into the first container portion for aerating the first container portion;

the plurality of floor jets having a cross-section at the aeration orifice sized so that a downwardly directed liquid speed at the cross-section is greater than zero and smaller than the upward ascension rate of the gas bubbles thereby producing a countercurrent wherein the gas bubbles rise through the liquid into the first container portion and the liquid flows downwardly through the plurality of floor jets from the first container portion to the second container portion;

means for providing a flow rate of the liquid through the liquid inlet and into the solid bed so that said countercurrent is produced in substantially all of said plurality of floor jets; and means located within the floor jets below the aeration orifice, for restricting the flow rate of the liquid through the floor jets.

3. A solid-bed reactor for biological sewage treatment comprising:

a solid bed;

an intermediate floor supporting the solid bed and including floor jets having aeration orifices integrated into the floor jets for introducing gas bubbles into an upper portion of the floor jets, each of the floor jets having an intake region, the intake region having a clear cross-section sized such that a downwardly directed flow speed of the outgoing water in the intake region is greater than zero and lower than an upward rate of ascent of the gas bubbles thereby producing a countercurrent flow, the aeration orifices being positioned below the intermediate and the gas bubbles from the aeration orifices rising through the water and into the solid bed for aerating the bed;

a liquid flow restrictor disposed within the floor jet below the aeration orifices defining means for restricting flow of the fluid through the floor jet; and means for flowing the liquid into the solid bed at a rate so that said countercurrent is produced in substantially all of said floor jets.

4. A solid-bed reactor as claimed in claim 3, wherein the solid bed is at least in part a packing of static mixer elements, by means of which the rising gas bubbles are distributed.

5. A solid-bed reactor as claimed in claim 3, wherein each of the floor jets is essentially a tube having below the intermediate floor at least one lateral bore which serves as an aeration orifice and having in the central area at least one lateral aperture through which washing air is fed into the solid bed.

6. A solid-bed reactor as claimed in claim 3, wherein the aeration orifices are exchangeable parts.

7. A solid-bed reactor as claimed in claim 3, wherein each of the floor jets is attached releasably to the underside of the intermediate floor.

8. A solid-bed reactor as claimed in claim 3, wherein each of the floor jets further comprise a releasably attached aeration orifice.

9. A solid-bed reactor as claimed in claim 3, wherein the aeration orifices are supplied with gas from an air cushion below the intermediate floor.

10. A solid-bed reactor as claimed in claim 9, further comprising at least two aeration orifices defining first and second air entry points respectively, the first and second air entry points being disposed at different levels.

* * * * *